United States Patent [19]

Schnatzmeyer

[11] 4,411,455
[45] Oct. 25, 1983

[54] RISER CONNECTOR

[76] Inventor: Mark A. Schnatzmeyer, 20 Oakbrook Dr., Lewisville, Tex. 75067

[21] Appl. No.: 173,987

[22] Filed: Jul. 31, 1980

[51] Int. Cl.³ .............................................. F16L 37/08
[52] U.S. Cl. ................................... 285/39; 166/237; 285/316
[58] Field of Search ................... 285/39, 316, 18, 321; 166/237, 86, 80

[56] References Cited

U.S. PATENT DOCUMENTS

| | | | |
|---|---|---|---|
| 3,088,521 | 5/1963 | Graves .............................. | 166/237 X |
| 3,222,088 | 12/1965 | Haeber ................................. | 285/18 |
| 3,241,864 | 3/1966 | Shaffer ................................. | 285/18 |
| 3,459,442 | 8/1969 | De Yarmett et al. .......... | 285/321 X |
| 3,488,031 | 1/1970 | Bezner et al. .................... | 285/316 X |
| 3,613,726 | 10/1971 | Torres ................................ | 285/316 |
| 4,046,405 | 9/1977 | Bonds ............................ | 285/321 X |
| 4,307,902 | 12/1981 | Schnatzmeyer .................. | 285/39 X |

*Primary Examiner*—Thomas F. Callaghan

[57] ABSTRACT

A riser connector for connecting two riser members. The first riser member has a profile shoulder and the second riser member has an expandable ring for engaging the shoulder of the first riser member thereby making a connection. The second riser member has a locking sleeve movable to a position wherein the locking sleeve holds the expandable ring in engagement. The locking sleeve is automatically activated by the relative movement of the riser members. When the locking sleeve is in its second position, an actuator sleeve in the bore of the locking sleeve automatically moves to a position wherein the locking sleeve is locked in its second position.

The riser connector is disconnected by a tool attached to the end of a pipe string which is inserted in the bore of the riser members. The tool engages the actuator sleeve and shifts it to a position wherein the locking sleeve is unlocked. The tool then engages the locking sleeve and shifts it to its first position wherein the expandable ring is no longer held in engagement with the riser member.

26 Claims, 10 Drawing Figures fig.1 fig.2 fig.4 fig.3 fig.5 fig.6 fig.7       fig.8 fig.9 fig.10

RISER CONNECTOR

BACKGROUND OF THE INVENTION

The present invention relates to a mechanical riser connector to be used in subsea operations. There are a number of presently known riser connectors many of which require diver assistance during connecting and disconnecting operations. However, there are other riser connectors which do not require diver assistance. For example, U.S. Pat. No. 4,138,148 does not require diver assistance since it is automatically connectable and is releasable by internal means activated by hydraulic pressure. My co-pending application Ser. No. 57,342 discloses a riser connector which may be remotely activated by a shifting tool.

However, the present invention is considerably different than prior riser connectors in that it connects automatically and locks without the use of a shifting tool, and it disconnects through purely mechanical operation. Such mechanical operation is performed by a novel shifting tool. None of the prior art riser connectors are operable in this manner. The present invention also avoids inadvertent disconnection caused in some riser connectors by the passage of objects, such as flow line pigs, through the bores of the riser members. The riser connector can only be disconnected by movement of the shifting tool in the bore of the riser connector first in one longitudinal direction followed by movement in the other longitudinal direction.

SUMMARY OF THE INVENTION

The present invention is a mechanical riser connector for a riser including a first riser member, a second riser member which telescopes over the first riser member, first and second connecting means on each of the riser members, and a locking sleeve in the second riser member for controlling the first and second connecting means, the locking sleeve being movable from a first position wherein the riser members are not connected by the first and second connecting means to a second position wherein the riser members are connected. The locking sleeve is activated by the telescoping movement of the second riser member relative to the first riser member. The present invention also includes locking means for locking the locking sleeve in its second position and an actuator sleeve in the bore of the locking sleeve. The actuator sleeve is movable from a first position wherein the locking means is not activated to a second position wherein the locking means is activated.

The present invention includes a novel shifting tool to be run on the end of a pipe string, wire line, or cable into the bore of the riser to disconnect the riser members. The tool includes an expandable split ring member for engaging the actuator sleeve so that the actuator sleeve is moved from its second to its first position as the tool is lowered in the riser. The tool also includes another expandable split ring member for engaging the actuator sleeve and locking the actuator sleeve to the locking sleeve so that the locking sleeve can be returned to its first position so the tool moves upward in the riser. The tool also includes means for releasing the second engagement means when the locking sleeve is in its first position.

One object of the present invention is to provide a mechanical riser connector which does not require a shifting tool or diver assistance to make the connection between elements of the connector and does not depend upon hydraulic operations to detach the riser members.

Another object of the present invention is to provide a mechanical riser connector which will not become inadvertently detached by the passage of a flow line pig or tools through the bore of the riser member.

Yet another object of the present invention is to provide a mechanical riser connector which is automatically connected by the positioning of one riser member over another riser member and which can be disconnected by a mechanical operation utilizing a shifting tool.

A further object of the present invention is to provide a novel shifting tool for use in a riser connector, which riser connector automatically connects but requires movement of the elements of the riser connector first in one longitudinal direction and then in another longitudinal direction prior to disconnecting the riser members.

BRIEF DESCRIPTION OF THE DRAWINGS

The features of the present invention will be more clearly understood in conjunction with the accompanying drawings wherein.

DESCRIPTION OF THE PREFERRED EMBODIMENT

The preferred riser connector is comprised of a first riser member A and a second riser member B which telescopes over the end of the first riser member A. The riser member A has a first connecting means which may be comprised of an outwardly projecting profile means on its upper end that includes a downwardly facing shoulder 10 on the bottom of ramp 12. Ramp 14 is at the top of the profile of riser member A. Groove 16 is between ramps 14 and 12 and groove 18 is below ramp 12. Grooves 16 and 18 are not identical.

The second riser member B includes a second connecting means which may be comprised of an expandable locking ring C, as well as locking sleeve D and actuator sleeve E. The expandable locking ring C is in recess 22 of the riser member B and rests on shoulder 23 of riser member B. The expandable locking ring C has an upwardly facing shoulder 24 which complements shoulder 10 of riser member A. As hereinafter explained, any tension force applied to the riser members when connected is transmitted through the shoulders 10 and 24.

Figure 1:
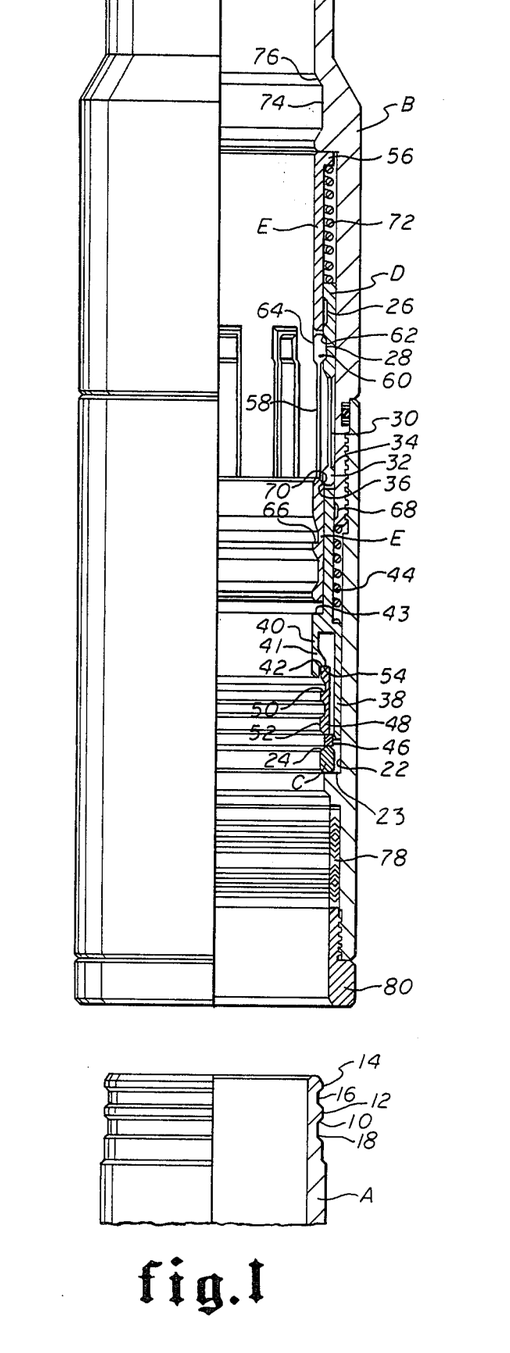
FIG. 1 is a cross-sectional view of the second riser member being lowered over the first riser member.
Figure 2:
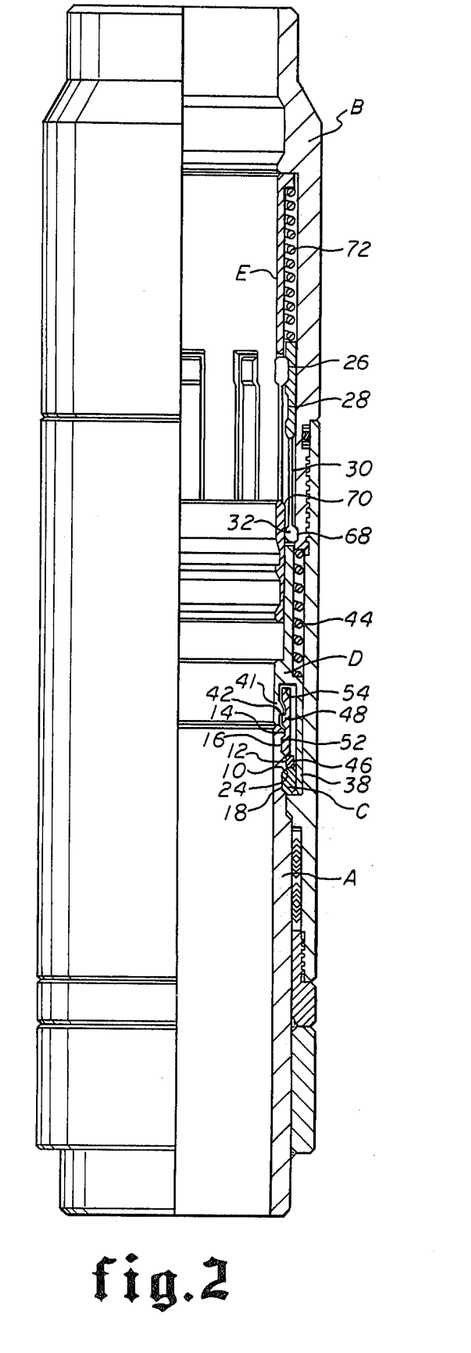
FIG. 2 is a cross-sectional view of the riser members fully connected.
Figure 3:
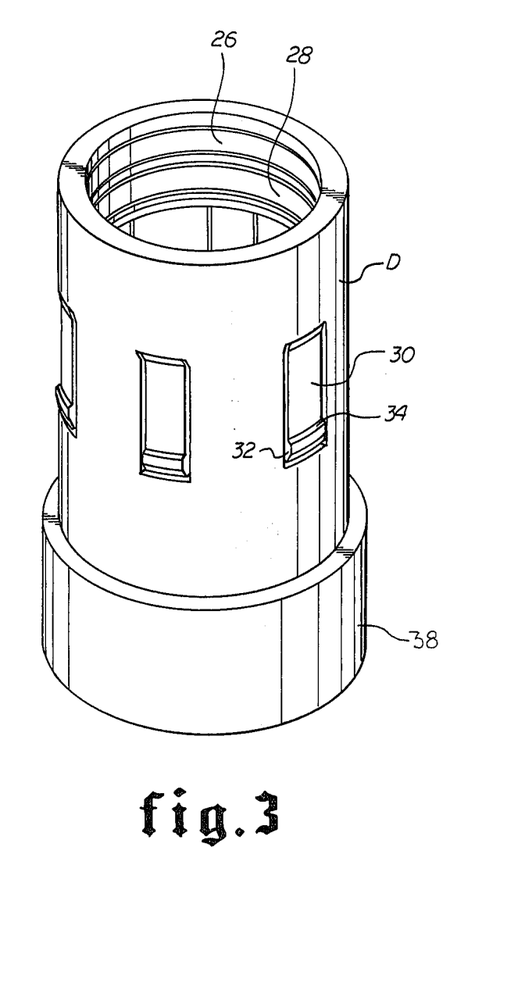
FIG. 3 is a side view of the locking sleeve of the second riser member.

The locking sleeve D is a tubular member longitudinally movable in the bore of the riser member B from a first position as illustrated in FIG. 1 to a second position as illustrated in FIG. 2. The locking sleeve D has two grooves 26, 28 at its interior upper end. As can be seen in FIG. 3, locking sleeve D has a plurality of downward projecting collet fingers 30 interdispersed through its mid section. Each collet finger 30 has a collet head 32 at its end with an outwardly projecting upwardly facing shoulder 34 and an inwardly projecting, downwardly facing shoulder 36. The lower end of locking sleeve D is comprised of outer sleeve 38 and inner sleeve 40 having a flange or skirt 41 on its exterior with a downwardly facing square shoulder 42. Locking sleeve D has an upwardly facing square shoulder 43 on its interior bore. Spring 44 is between locking sleeve D and riser member B and preferentially urges locking sleeve D downwardly to its second position relative to riser member B.

The locking sleeve D is retained in the FIG. 1 position by retention means comprised of spacer ring 46 which rests on expander ring C and expandable ring means 48 which rests on spacer ring 46. Ring means 48 is an expandable member and is in the relaxed position in FIG. 1. Expandable ring means 48 has an inwardly projecting square shoulder 50, a ramp 52 in its interior bore which complements groove 16, and an upwardly facing square shoulder 54. In the FIG. 1 position, the contact between shoulders 54 and 42 retains the locking sleeve D in its first position. However, expansion of expandable ring means 48, such as by contact between the profile of riser member A with the interior profile of ring means 48, would free the contact between shoulders thereby allowing locking sleeve D to be driven downward, relative to riser member B, to its second position by the spring force 44.

The actuator sleeve E is a tubular member longitudinally movable in the bore of locking sleeve D relative to locking sleeve D from a first position as illustrated in FIG. 1, to a second position, as illustrated in FIG. 2. Actuator sleeve E has a flange 56 at its upper end. Actuator sleeve E has a plurality of upwardly projecting collet fingers 58 interdispersed through its mid section. Each collet finger 58 has a collet head 60 with an upwardly facing outwardly pointing shoulder 62. The collet heads also have an interior surface 64. The actuator sleeve has an upwardly facing square shoulder 66 on its lower interior bore.

The locking means for locking the locking sleeve in the FIG. 2 position includes the groove 68 on the bore of the second riser member B having shoulders which compliment the corresponding shoulders of collet head 32. When the actuator sleeve E and the locking sleeve D are in their second positions as illustrated in FIG. 2, the locking means lock the locking sleeve D in the second position since the exterior surface of the actuator sleeve E serves as a means for holding collet heads 32 into groove 68 thereby precluding movement of the locking sleeve D.

The engagement or carrying means for causing the actuator sleeve E to be carried by the locking sleeve D as the locking sleeve D moves to its second position includes the shoulder 36 of collet head 32 and a complementary upwardly facing shoulder 70 on the exterior of the actuator sleeve E. The contact between the shoulders transmits the downward movement of the locking sleeve D to the actuator sleeve E until collet head 32 is free to expand outward into groove 68 thereby allowing the actuator sleeve E to move independently of locking sleeve D.

A second resilient urging means such as spring 72 is located in the bore of riser member B and abuts the bottom of flange 56 and the top of locking sleeve D. Spring 72 preferentially urges the actuator sleeve E to move upward to its second position.

A locking means for locking the actuator sleeve to its second position includes the collet heads 60 on collet fingers 58 of the actuator sleeve E and the groove 28 of locking sleeve D.

Groove 74 is above the actuator and locking sleeves and is on the interior bore of second riser member B. Downwardly facing shoulder 76 is the top wall of groove 74.

Seals 78 are in a recess on the interior bore of the lower end of the second riser member B. Seals 78 form a seal between the exterior of riser member A and the interior of riser member B when the riser members are connected.

Guide shoe 80 is on the end of second riser member B and aid in placing the second riser member B over the first riser member A.

To connect the riser members, the second riser member is lowered over the first riser member. As illustrated in FIG. 1, the locking sleeve D is retained in the first position by the expandable ring means 48. As riser member B telescopes over riser member A, ramp 14 contacts expandable locking ring C expanding it into recess 22. Continued telescoping movement causes ramp 14 and ramp 12 to expand both expandable locking ring C and ring means 48. It should be noted that expandable locking ring C does not collapse into groove 16 since the length of expandable locking ring C is longer than the length of groove 16; therefore expandable locking ring C rides along the exterior of the ramps 12 and 14. When expandable ring means 48 is sufficiently expanded, shoulder 54 of ring means 48 is free from shoulder 42 of locking sleeve D. Once free, the locking sleeve D is activated and is forced to move downward from its first position by spring 44 until the bottom of outer sleeve 38 of locking sleeve D abuts the top of expander ring C which is in its expanded position by contact with pump 12. In this position, the exterior of flange 41 of the inner sleeve is adjacent to the interior bore of the ring means 48 below shoulder 54.

Continued telescoping movement between the riser members causes expander ring C to collapse into groove 18 and the bottom ramp 52 of the ring means 48 collapses into groove 16. Once expander ring C collapses, the locking sleeve D is again free to move downward. As the locking sleeve D moves downward, it carries the actuator sleeve E downward until collet head 32 of locking sleeve D is adjacent to groove 68 of riser member B. At this point, the locking sleeve D is in its second position and the collet heads 32 expand into groove 68. Once the collet heads 32 so expand, the engagement between collet head 32 and shoulder 70 of actuator sleeve E ceases and the actuator sleeve E is released. Actuator sleeve E is then driven from its first position upward, relative to the locking sleeve D, to its second position by spring 72, thereby locking collet head 32 into groove 68.

When a tension force is applied to riser member B, the shoulder 23 transmits the force to expander ring C. Expander ring C, in turn, transmits the force through shoulder 10 to riser member A. Expander ring C is retained in engagement with groove 18 as long as the outer sleeve 38 of locking sleeve D is in its lowermost position as in FIG. 2. As long as expander ring C remains locked into groove 18, the force will not separate riser member A from riser member B.

Figure 4:
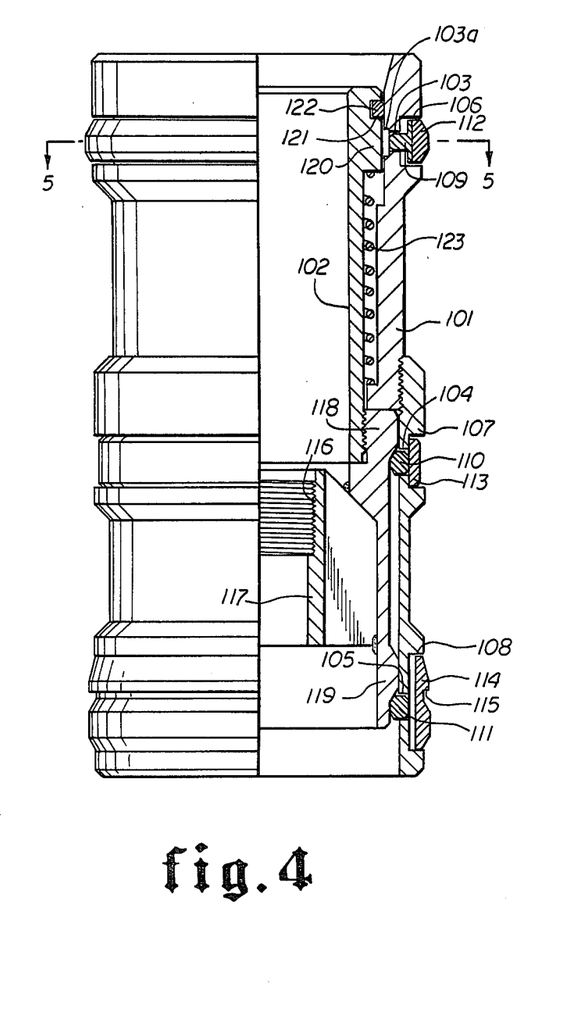
FIG. 4 is a cross-sectional view of the shifting tool.
Figure 5:
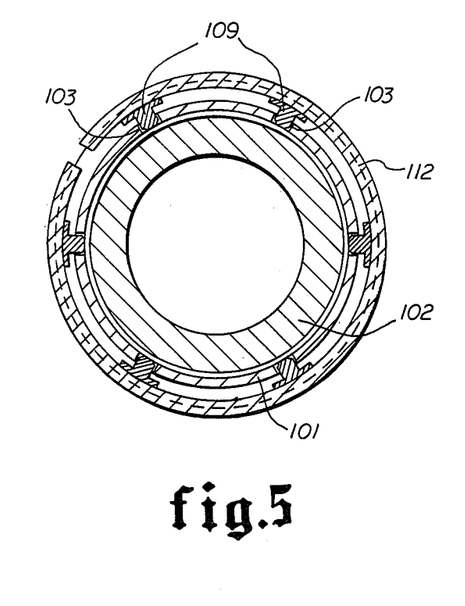
FIG. 5 is a cross-sectional view of the FIG. 4 shifting tool along line 5—5 in FIG. 4.

As illustrated in FIG. 4, the tool which is used in disconnecting the riser members is comprised of an outer housing 101 and an inner sleeve 102. The outer housing 101 has upper, middle and lower sets of ports 103, 104, and 105 which connect the bore of the outer housing 101 with grooves 106, 107, and 108 on the exterior of the outer housing 101. The interior end of the ports 103 opens into interior groove 103a on the bore of outer housing 101. In each of the ports 103, there is a key 109 which is movable within the port 103. The ports 103 with keys 109 can best be seen in FIG. 5. Similarly, in each of ports 104 is a key 110 and in each of ports 105 is a key 111. Expandable split ring members 112, 113 and 114 are in grooves 106, 107 and 108. As can be seen in FIG. 4, although the ring members 112, 113 and 114 are in the relaxed position, the key members 109, 110 and 111 can be forced radially outward thereby urging the key members outward. Downward facing square shoulder 115 is on the exterior of ring 114.

The inner sleeve 102 is longitudinally movable in the bore of outer housing 101. The inner sleeve is capable of being connected to a pipe string, wire line, or cable by threads 116 which is connected to web member 117. Web member 117 is welded to the bore of inner sleeve 102.

The inner sleeve 102 has a middle ramp 118 and a lower ramp 119 on its exterior bore. At its upper end, inner sleeve 102 has flange 120 having groove 121 on its exterior. Expandable C-ring 122 is in groove 121. Spring 123 is housed between the inner sleeve 102 and the outer housing 101 and urges the inner sleeve to its first position as shown in FIG. 1.

Figure 9:
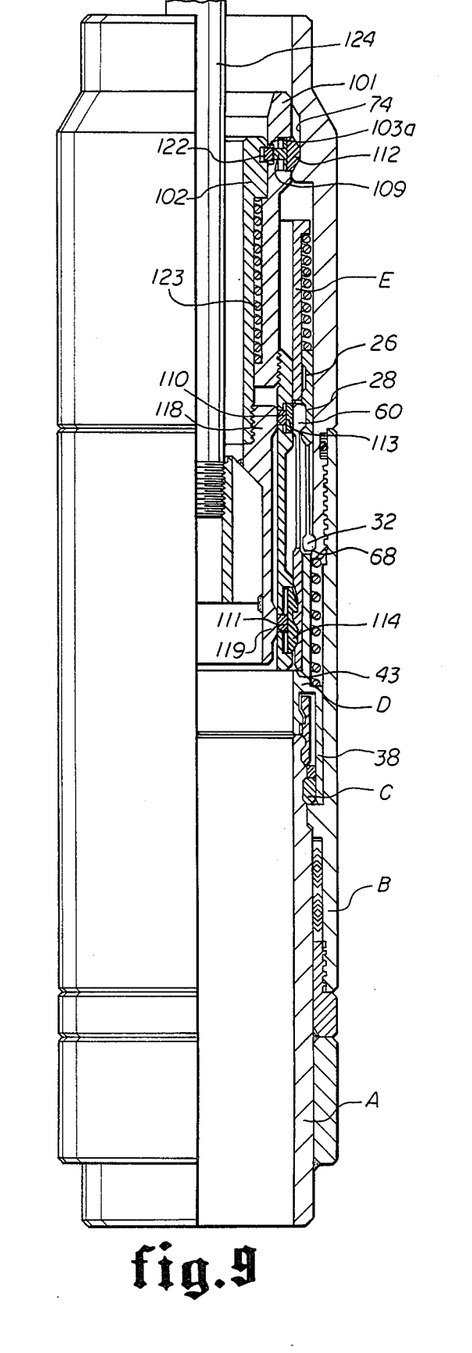
FIG. 9 is a cross-sectional view of the shifting tool in the riser connector after the tool has shifted the actuator sleeve until the actuator sleeve bottoms out against the locking sleeve and after the inner sleeve of the tool has shifted thereby locking the tool in a position wherein the collet fingers of the actuator sleeve firmly engage the groove of the locking sleeve.

As will be explained in more detail herein, the inner sleeve 102 of the tool is movable from a first position, relative to the outer housing 101, to a second position. The inner sleeve 102 in the second position is shown in FIG. 9. In the second position, inner sleeve 102 has moved downward so that ramps 118 and 119 urge keys 110 and 111 outward thereby expanding ring 113 and supporting ring 114. Additionally, groove 121 is adjacent to groove 103a thereby allowing ring 122 to expand outward into groove 103a urging keys 109 outward and supporting ring 112. The ring 122, when expanded, occupies part of both groove 121 and groove 103a and thereby locks the outer sleeve 101 to inner sleeve 102.

Figure 6:
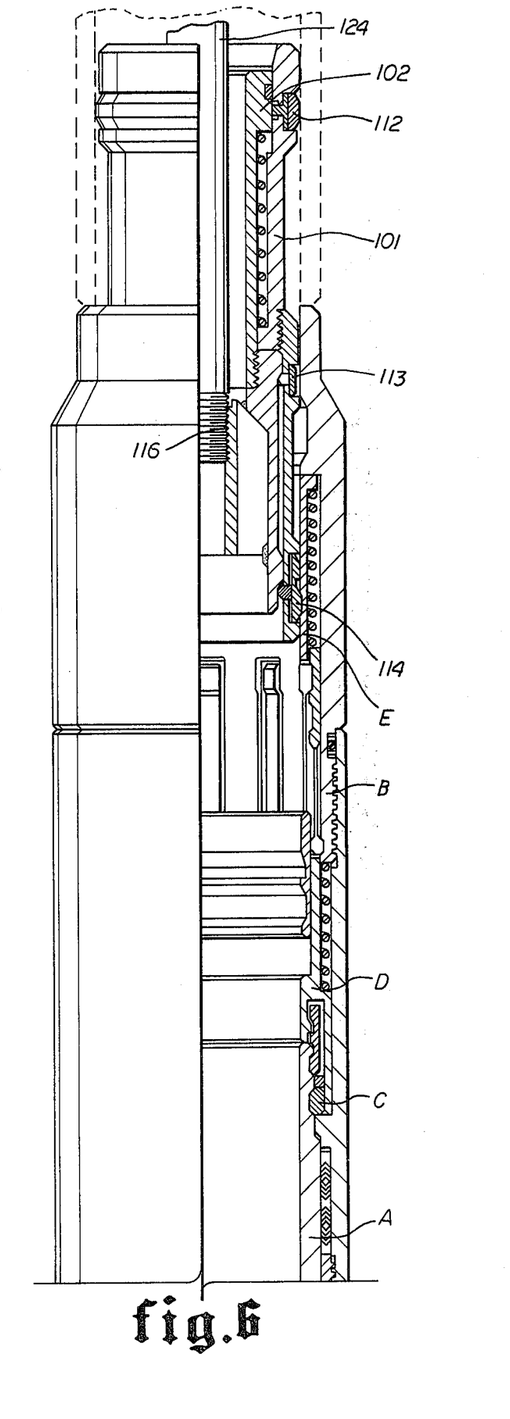
FIG. 6 is a cross-sectional view of the tool and the riser members after the tool is lowered into the upper end of the second riser member.

To disconnect the riser members, the tool is attached by threads 116 to a pipe string 124 and lowered into the riser. As illustrated in FIG. 6, the ring members 112, 113 and 114 are free to contract inward as the exterior of the ring members 112, 113 and 114 contact the bore of the riser above the second riser member A.

Figure 7:
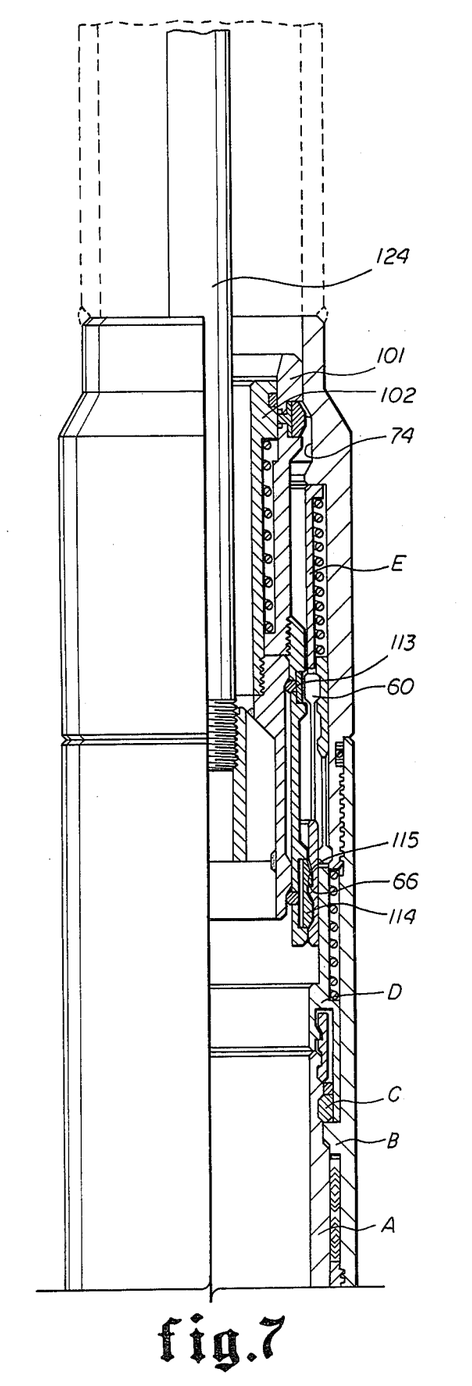
FIG. 7 is a cross-sectional view of the tool and the riser members as the lower split ring of the tool first engages the actuator sleeve.
Figure 8:
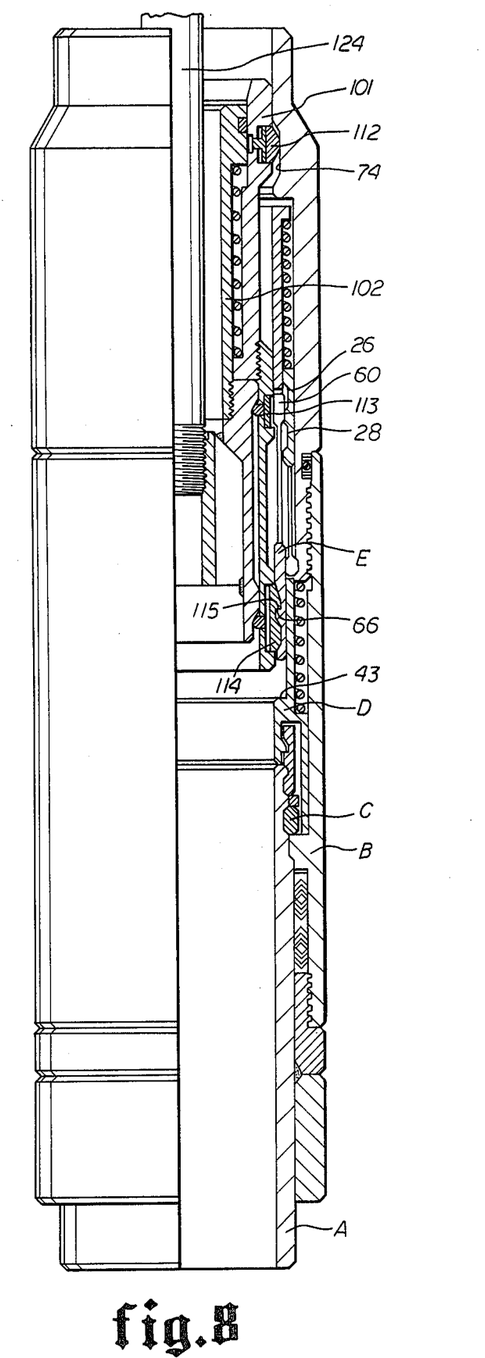
FIG. 8 is a cross-sectional view of the tool and the riser members as the tool, through the engagement between the lower split ring and the actuator sleeve, shifts the actuator sleeve downward thereby propping out the collet heads of the actuator sleeve.

As shown in FIG. 7, when the square shoulder 115 of ring 114 of the tool contacts square shoulder 66 of actuator sleeve E, the ring 114 is not deflected inward; rather, these matching shoulders engage and any further downward movement of the tool will cause the actuator sleeve E to also move downward. This is illustrated in FIG. 8 where the engagement of the shoulders and subsequent downward movement of the tool has caused actuator sleeve E to move downward causing collet head 60 of actuator sleeve E to prop out of groove 26 of locking sleeve D. Although ring 113 of the tool is immediately adjacent to the collet head 60 in both FIGS. 7 and 8, ring 113 does not hold the head 60 in groove 26 since ring 113 is in its relaxed state contracted inward.

The tool and the actuator sleeve E are free to move downward until the bottom of actuator sleeve E abuts shoulder 43 of locking sleeve. At this point the actuator sleeve has been returned to its first position and the collet heads 60 are in engagement with groove 28 of locking sleeve D, but free to deflect out of groove 28. Additional downward force applied in the pipe string will result in compressing spring 123 of the tool and the movement of inner sleeve 102 downward, relative to outer housing 101 (See FIG. 9). As the inner sleeve moves downward from its first position to its second position, ramps 118 and 119 drive keys 110 and 111 outward expanding ring 113 and propping out ring 114. The expanded ring 113 locks collet head 60 of actuator sleeve E into firm engagement with groove 28 of locking sleeve D thereby connecting the sleeves D and E. Additionally, as the inner sleeve 102 moves downward, C-ring 122 expands outward into groove 103a forcing keys 109 outward within the inner diameter of expanded ring 112, which has relaxed radially outward into groove 74 of second riser member B. As illustrated in FIG. 9, the expanded C-ring 122 occupies both part of groove 123 of the inner sleeve 102 and groove 103a of outer housing 101, therefore, the expanded C-ring locks the inner sleeve 102 to outer housing 101. Additionally, when the actuator sleeve E is in the FIG. 9 position, the collet heads 32 of locking sleeve D have been unlocked and are not firmly engaging groove 68 and the locking sleeve D is free to be moved upward.

Figure 10:
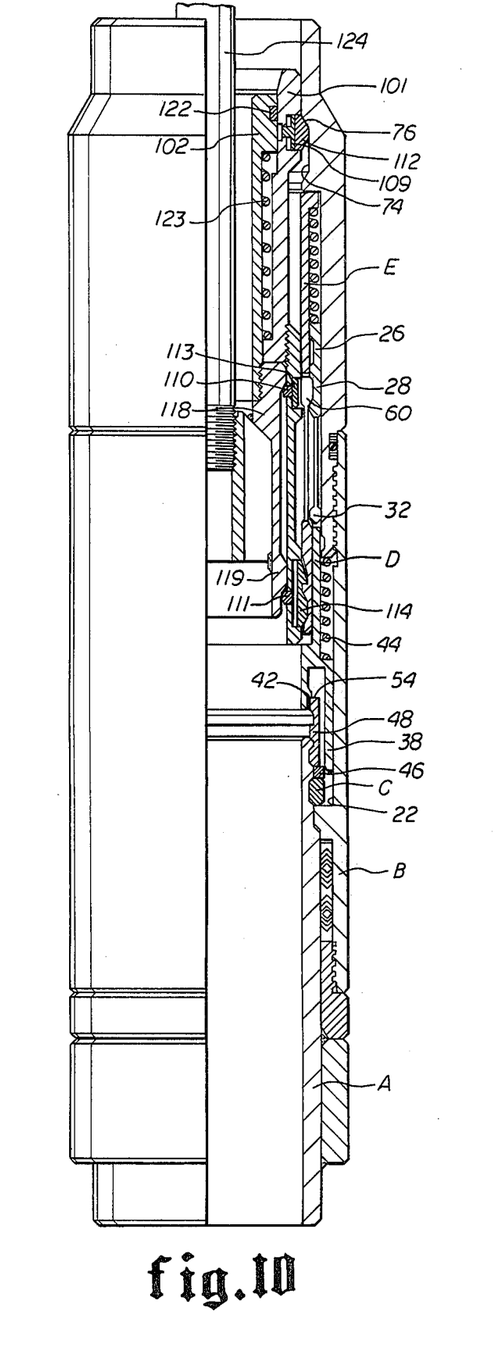
FIG. 10 is a cross-sectional view of the shifting tool in the riser connector after the shifting tool has moved upward shifting the actuator sleeve and the locking sleeve upward, thereby disconnecting the riser members.

Once the inner sleeve 102 has moved to its second position and locked with the outer housing 101, no further downward movement of the shifting tool is possible. The pipe string and tool are then moved upward. The upward movement of the tool is transmitted to the actuator sleeve E through the engagement of rings 113 and 114 with the actuator sleeve E and to the locking sleeve D by the engagement of collet head 60 of the actuator sleeve E with groove 28 of the locking sleeve. As the tool moves upward, the locking sleeve D is moved upward from its second position to its first position so that the outer sleeve 38 no longer backs the expander locking ring C. As the locking sleeve D moves up, the ring means 48 is expanded and contracts until shoulder 54 of ring means 48 abuts shoulder 42 of the locking sleeve thereby retaining the locking sleeve D. At this point as illustrated in FIG. 10, the top shoulder of ring 112 abuts shoulder 76 of groove 74 of riser member B thereby driving key 109 and ring 122 inward unlocking the inner sleeve 102. As illustrated in FIG. 9, once unlocked, spring 123 drives the inner sleeve 102 from its second to its first position and the ramps 118 and 119 no longer urge keys 113 and 114 outward. The tool is then free of the actuator sleeve and may be retrieved from the riser.

Once the tool is retrieved, an upward force applied to second riser member B will cause the locking expanding ring C to expand into recess 22 and the second riser member may be pulled to the surface, bringing with it locking expanding ring C, spacer ring 46 and ring means 48.

What is claimed is:

1. A riser connector for connecting a first riser member to a second riser member as the second riser member telescopes over the first riser member comprising
   a first connecting means on the first riser member,
   a second connecting means on the second riser member wherein the second connecting means can engage the first connecting means thereby connecting the riser members,
   a locking sleeve in the bore of the second riser member for controlling the first and second connecting means and movable relative to the second riser member from a first position wherein the first and second connecting means are not in engagement to a second position wherein the first and second connecting means are in engagement, the locking sleeve being activated so as to move from its first to its second position by the telescoping movement of the riser members,
   an actuator sleeve movable in the bore of the locking sleeve from a first position to a second position, the direction of movement of the actuator sleeve from its first position to its second position being in a direction opposite the direction of movement of the locking sleeve from its first position to its second position,
   means for carrying the actuator sleeve with the locking sleeve as the locking sleeve moves to its second position,
   means for preferentially urging the actuator sleeve to its second position, and
   locking means locking the locking sleeve in its second position when the actuator sleeve is in its second position.

2. A riser connector for connecting a first riser member to a second riser member as the second riser member telescopes over the first riser member comprising
   a downwardly facing shoulder on the exterior of the first riser member,
   the second riser member having a recess on its bore,
   an expandable locking ring in the recess and having an upwardly facing shoulder on its interior for engaging the first riser member shoulder and thereby connecting the riser members,
   a locking sleeve movable in the bore of the second riser member from a first position wherein the riser members are not connected to a second position wherein the riser members are connected, the locking sleeve being activated by the movement of the riser members;
   locking means for locking the locking sleeve in its second position;
   an actuator sleeve for controlling the locking means and movable in the bore of the locking sleeve from a first position relative to the locking sleeve wherein the locking means is not locked to a second position relative to the locking sleeve wherein the locking means is locked, the direction of movement of the actuator sleeve from its first position to its second position being in a direction opposite the direction of movement of the locking sleeve from its first position to a second position; and
   means for carrying the actuator sleeve with the locking sleeve as the locking sleeve moves to its second position.

3. A riser connector for connecting a first riser member to a second riser member as the second riser member telescopes over the first riser member comprising
   a downwardly facing shoulder on the exterior of the first riser member,
   the second riser member having a recess on its bore,
   an expandable locking ring in the recess and having an upwardly facing shoulder on its interior for engaging the first riser member shoulder and thereby connecting the riser members,
   a locking sleeve movable in the bore of the second riser member from a first position wherein the riser members are not connected to a second position wherein the riser members are connected, the locking sleeve being activated by the movement of the riser members;
   locking means for locking the locking sleeve in its second position;
   an actuator sleeve for controlling the locking means and movable in the bore of the locking sleeve from a first position relative to the locking sleeve wherein the locking means is not locked to a second position relative to the locking sleeve wherein the locking means is locked;
   means for carrying the actuator sleeve with the locking sleeve as the locking sleeve moves to its second position;
   expandable ring means in the recess of the second riser member and above the expandable locking ring wherein the ring means in the contracted position holds the locking sleeve in its first position and wherein the ring means in the expanded position frees the locking sleeve to move to the second position; and
   first resilient urging means in the bore of the second riser member for preferentially urging the locking sleeve to its second position.

4. The riser connector of claim 3 including a profile member on the exterior of the first riser member for expanding the ring means outwards as the second riser member telescopes over the first riser member thereby free the locking sleeve to be moved by the first resilient urging means to its second position.

5. The riser connector of claim 4 wherein the locking means includes
   a plurality of collet fingers on the locking sleeve with each collet finger having a head;
   the second riser member having a groove for engaging the head of the collet fingers; and
   means on the actuator sleeve for holding the head and the groove in engagement when the actuator sleeve is in its second position.

6. The riser connector of claim 5 including second resilient urging means for preferentially urging the actuator sleeve to its second position.

7. The riser connector of claim 6 including second locking means for locking the actuator sleeve to the locking sleeve.

8. The riser connector of claim 7 wherein the second locking means includes
   a plurality of collet fingers on the actuator sleeve with each collet finger having a head with an upwardly pointing, outwardly projecting shoulder; and the locking sleeve having a groove in its bore with an inwardly projecting downwardly pointing shoulder for engaging the shoulder of the head of the collet fingers on the actuator sleeve.

9. The riser connector of claim 8 including seal means on the bore of the second riser member for sealing with the first riser member.

10. The riser connector of claim 9 wherein the locking sleeve includes an outer sleeve at its lower end for forcing the expandable locking ring into engagement with the downwardly facing shoulder of the first riser member when the locking sleeve is in its second position.

11. A riser connector for connecting a first riser member to a second riser member as the second riser member telescopes over the first riser member comprising
profile means on the first riser member,
the second riser member having a recess on its bore,
an expandable locking ring in the recess for engaging the profile means thereby connecting the riser members;
a locking sleeve movable in the bore of the second riser member from a first position wherein the riser members are not connected to a second position wherein the riser members are connected;
retention means for keeping the locking sleeve in its first position, the retention means being released by the telescoping movement of the riser members;
first resilient urging means for urging the locking sleeve to its second position;
locking means for locking the locking sleeve in its second position; and
an actuator sleeve for controlling the locking means and movable in the bore of the locking sleeve from a first position relative to the locking sleeve wherein the locking means is not locked to a second position relative to the locking sleeve wherein the locking means is locked, the direction of movement of the actuator sleeve from its first position to its second position being in a direction opposite the direction of movement of the sleeve from its first position to its second position.

12. A riser connector for connecting a first riser member to a second riser member as the second riser member telescopes over the first riser member comprising
profile means on the first riser member;
the second riser member having a recess on its bore;
an expandable locking ring in the recess for engaging the profile means thereby connecting the riser members;
a locking sleeve movable in the bore of the second riser member from a first position wherein the riser members are not connected to a second position wherein the riser members are connected;
retention means for keeping the locking sleeve in its first position, the retention means being released by the telescoping movement of the riser members;
first resilient urging means for urging the locking sleeve to its second position;
locking means for locking the locking sleeve in its second position;
an actuator sleeve for controlling the locking means and movable in the bore of the locking sleeve from a first position relative to the locking sleeve wherein the locking means is not locked to a second position relative to the locking sleeve wherein the locking means is locked;
engagement means on the locking sleeve and the actuator sleeve for carrying the actuator sleeve with the locking sleeve as the locking sleeve moves from its first position to its second position, the engagement means becoming released when the locking sleeve is in its second position;
second resilient urging means preferentially urging the actuator sleeve to its second position; and
second locking means for locking the actuator sleeve to the locking sleeve.

13. The riser connector of claim 12 wherein the profile means includes a downwardly facing shoulder and the expandable locking ring includes an upwardly facing shoulder.

14. The riser connector of claim 12 wherein the retention means includes
a downwardly facing square shoulder on the locking sleeve, and
expandable ring means in the recess of the second riser member and above the expandable locking ring, the expandable ring means having an upwardly facing square shoulder for engaging the square shoulder of the locking sleeve, the expandable ring means being expanded by the telescoping movement of the riser members from a contracted position wherein the shoulders engage to an expanded position wherein the square shoulder of the locking sleeve and the square shoulder of the expandable ring means do not engage and the locking sleeve is free to move to its second position.

15. The riser connector of claim 12 wherein the locking means includes
a plurality of collet fingers on the locking sleeve with each collet finger having a head;
the second riser member having a groove for engaging the head of the collet fingers; and
means on the actuator sleeve for holding the collet finger head of the locking sleeve and the groove of the second riser member in engagement when the actuator sleeve is in its second position.

16. The riser connector of claim 12 wherein the engagement means includes
an inwardly projecting downwardly facing shoulder on the head of each collet finger of the locking sleeve, and
an outwardly projecting, upwardly facing shoulder on the actuator sleeve.

17. The riser connector of claim 12 wherein the second locking means includes
a plurality of collet fingers on the actuator sleeve with each collet finger having a head with an upwardly pointing, outwardly projecting shoulder, and
the locking sleeve having a groove on its bore with an inwardly projecting, downwardly pointing shoulder for engaging the shoulder of the head of the collet fingers.

18. The riser connector of claim 12 wherein the locking sleeve includes an outer sleeve at its lower end for forcing the expandable locking ring into engagement with the profile means of the first riser member when the locking sleeve is in its second position.

19. A riser connector for connecting a first riser member to a second riser member as the second riser member telescopes over the first riser member comprising a downwardly facing shoulder on the first riser member, the second riser member having a recess on its bore, an expandable locking ring in the recess and having an upwardly facing shoulder for engaging the shoulder of the first riser member thereby connecting the riser members;

a locking sleeve movable in the bore of the second riser member from a first position wherein the riser members are not connected to a second position wherein the riser members are connected, a downwardly facing square shoulder on the locking sleeve, an outer sleeve on the lower end of the locking sleeve for forcing the expandable locking ring into engagement with the downwardly facing shoulder of the first riser member when the locking sleeve is in its second position, expandable ring means in the recess of the second riser member and above the expandable locking ring, the expandable ring means having an upwardly facing square shoulder for engaging the square shoulder of the locking sleeve, the expandable ring means being expanded by the telescoping movement of the riser members from a contracted position wherein the shoulders engage to an expanded position wherein the shoulders do not engage and the locking sleeve is free to move to its second position, first resilient urging means preferentially urging the locking sleeve to its second position, an actuator sleeve for controlling the locking means and movable in the bore of the locking sleeve from a first position relative to the locking sleeve wherein the locking means is not locked to a second position relative to the locking sleeve wherein the locking means is locked, a plurality of collet fingers on the locking sleeve with each collet finger having a head, the second riser member having a groove for engaging the head of the collet fingers of the locking sleeve, means on the actuator sleeve for holding the collet finger head of the locking sleeve and the groove of the second riser member in engagement when the actuator sleeve is in its second position, an inwardly projecting, downwardly facing shoulder on the head of each collet finger of the locking sleeve, an outwardly projecting, upwardly pointing shoulder on the actuator sleeve, second resilient urging means preferentially urging the actuator sleeve to its second position, a plurality of collet fingers on the actuator sleeve with each collet finger having a head with an upwardly pointing, outwardly projecting shoulder, and the locking sleeve having a groove in its bore with an inwardly projecting downwardly pointing shoulder for engaging the shoulder of the head of the collet fingers.

20. The riser connector of claim 19 including seal means on the bore of the second riser member for sealing with the first riser member.

21. A tool which is attachable to a pipe string for use in disconnecting a riser connector comprising an outer housing having a plurality of sets of ports connecting the bore of the outer housing with a plurality of grooves on the exterior of the housing, key members in each port, split ring members in each groove, an inner sleeve movable in the bore of the outer housing from a first position to a second position wherein the key members and split ring members are urged outward when the inner sleeve is in its second position;

resilient urging means housed between the outer housing and the inner sleeve for preferentially urging the inner sleeve to its first position;

the outer housing having a groove on its bore adjacent to one of the set of ports;

the inner sleeve having a recess on its exterior which is adjacent to the groove on the outer housing bore when the inner sleeve is in its second position; and an expandable ring member in the recess of the inner sleeve which is expandable when the inner sleeve is in its second position so that part of the ring member is in the recess of the inner sleeve and part of the ring member is in the groove.

22. The tool claimed in claim 21 wherein the inner sleeve has a plurality of ramps on its exterior for biasing the key members and split ring members outward when the inner sleeve is in its second position.

23. A tool which is attachable to a pipe string for use in disconnecting a riser connector comprising an outer housing having lower, middle and upper sets of ports connecting the bore of the outer housing with lower, middle and upper grooves on the exterior of the housing, said outer housing having a groove on its interior bore adjacent to the upper set of ports;

key members in each port;

split ring members in each groove on the exterior of the housing;

an inner sleeve having lower and middle ramps and an upper recess, the inner sleeve being movable in the outer housing from a first position to a second position wherein the lower and middle ramps are adjacent to the lower and middle set of ports and the upper recess is adjacent to the groove on the interior bore of the outer housing when the inner sleeve is in its second position, an expandable ring member in the recess of the inner sleeve which is expandable into the groove on the bore of the outer housing when the inner sleeve is in its second position, and resilient urging means housed between the outer housing and the inner sleeve for preferentially urging the inner sleeve to its first position.

24. The tool of claim 23 wherein one of the split rings has a downwardly facing square shoulder.

25. A tool for disconnecting two riser members connectedly a riser connector wherein the riser connector includes profile means on the first riser member, a recess on the bore of the second riser member, an expandable locking ring in the recess for engaging the profile means thereby connecting the riser members, a locking sleeve in the bore of the second riser member movable from a first to a second position wherein the riser members are connected when the locking sleeve is in its second position, the locking sleeve being activated by the movement of the riser members, the locking sleeve having a groove on its bore with an inwardly projecting, downwardly pointing shoulder, locking means for locking the locking sleeve in its second position, an actuator sleeve for controlling the locking means and movable in the bore of the locking sleeve from a first position wherein the locking means is not locked to a second position wherein the locking means is locked, resilient urging means for preferentially urging the actuator sleeve to its second position, an upwardly facing square shoulder on the interior of the actuator sleeve, a plurality of collet fingers on the actuator sleeve with each collet finger having a head with an upwardly pointing, outwardly projecting shoulder, the tool comprising an outer housing having lower, middle and upper sets of ports connecting the bore of the outer housing with lower, middle and upper grooves on the exterior of the housing, said outer housing having a groove on its interior bore adjacent to the uper set of ports, key members in each port;

split ring members in each groove on the exterior of the outer housing, with one split ring member having a downwardly facing square shoulder for engaging the upwardly facing square shoulder of the actuator sleeve and moving it from a first position to a second position, an inner sleeve having a lower and middle ramp and an upper recess, the inner sleeve being movable in the outer housing from a first position to a second position wherein the lower and middle ramps are adjacent to the lower and middle set of ports and the upper recess is adjacent to the groove on the bore of the outer housing when the inner sleeve is in its second position, the inner sleeve urging at least one key member and split ring member outward so that the shoulder of the head of the collet finger of the actuator sleeve securely engages the groove of the locking sleeve when the inner sleeve is in its second position, an expandable ring member in the recess of the inner sleeve which is expandable into the groove in the bore of the outer housing when the inner sleeve is in its second position thereby locking the inner sleeve in its second position and urging a key member and a split ring outward, and resilient urging means housed between the outer housing and the inner sleeve for preferentially urging the inner sleeve to its first position.

26. A riser connector comprising a first riser member having first connecting means;

a second riser member having second connecting means adapted to engage the first connecting means thereby connecting the first riser member to the second riser member;

a locking sleeve movably mounted in the bore of one of the riser members from a first position wherein the first and second connecting means are not in engagement to a second position wherein the first and second connecting means are in engagement;

locking means for locking the locking sleeve in its second position; and an actuator sleeve movably mounted in the bore of the locking sleeve for controlling the locking means, the actuator sleeve being movable relative to the locking sleeve from a first position wherein the locking means are not activated to a second position wherein the locking means are activated, the direction of movement of the actuator sleeve from its first position to its second position being in the direction opposite of the direction of movement of the locking sleeve from its first position to its second position.

* * * * *

UNITED STATES PATENT AND TRADEMARK OFFICE
CERTIFICATE OF CORRECTION

PATENT NO. : 4,411,455
DATED : October 25, 1983
INVENTOR(S) : Mark A. Schnatzmeyer It is certified that error appears in the above—identified patent and that said Letters Patent is hereby corrected as shown below:

On the title page the following should be added:

--[73] Assignee: Otis Engineering Corporation, Dallas, Texas--.

Signed and Sealed this

Tenth Day of July 1984

[SEAL]

Attest:

GERALD J. MOSSINGHOFF

Attesting Officer

Commissioner of Patents and Trademarks